United States Patent [19]

Decroix

[11] 4,451,598

[45] May 29, 1984

[54] COMPOSITIONS FOR SEALING PRODUCTS

[75] Inventor: Jean C. Decroix, Arras, France

[73] Assignee: Societe Chimique des Charbonnages S.A., Paris la Defense, France

[21] Appl. No.: 503,401

[22] Filed: Jun. 2, 1983

[30] Foreign Application Priority Data

Jun. 3, 1982 [FR] France ................... 82 9631

[51] Int. Cl.³ ............................................. C08L 31/00
[52] U.S. Cl. ................... 524/69; 264/331.18; 264/331.21; 524/70; 524/522; 524/66; 524/68
[58] Field of Search ............ 524/66, 68, 69, 522, 524/70; 264/331.18, 331.21

[56] References Cited

U.S. PATENT DOCUMENTS

| 3,249,567 | 5/1966 | Vigneault | 524/69 |
|---|---|---|---|
| 3,531,426 | 9/1970 | Shim et al. | 524/69 |
| 3,673,141 | 6/1972 | Trieschmann et al. | 524/69 |
| 3,882,066 | 5/1975 | Smith | 524/66 |
| 3,890,263 | 6/1975 | Meynard | 524/68 |
| 3,967,651 | 7/1976 | Snyder et al. | 524/66 |
| 3,980,598 | 9/1976 | Moorwessel et al. | 524/69 |
| 4,304,697 | 12/1981 | Agarwal et al. | 524/66 |
| 4,362,828 | 12/1982 | Agarwal et al. | 524/66 |

FOREIGN PATENT DOCUMENTS

| 2303838 | of 0000 | France . | |
|---|---|---|---|
| 1104401 | 9/1966 | United Kingdom | 524/66 |
| 1137545 | 12/1968 | United Kingdom | 524/68 |

Primary Examiner—Melvyn I. Marquis
Assistant Examiner—D. LeRoy
Attorney, Agent, or Firm—Finnegan, Henderson, Farabow, Garrett & Dunner

[57] ABSTRACT

A composition for sealing products comprising from 35 to 95 weight percent of at least one distillation product selected from the group consisting of bitumens and soft pitches, and from 5 to 65 weight pecent of a terpolymer having a melt index between 1 and 10 dg/minute and comprising: (i) from 88 to 98.7 mole percent of units derived from ethylene (ii) from 1 to 10 mole percent of units derived from an ester selected from alkyl acrylates and methacrylates, wherein said alkyl group has from 1 to 6 carbon atoms, and (iii) from 0.3 to 3 mole percent of units derived from maleic anhydride.

8 Claims, No Drawings

COMPOSITIONS FOR SEALING PRODUCTS

BACKGROUND OF THE INVENTION

The present invention relates to sealing products and products formed from them.

The building and civil engineering industry and other users of sealing products desire materials with performance characteristics which have high values of certain properties immediately after application and high values of the same properties measured after several years of aging under the effect of atmospheric agents. Such sealing products are useful in the lining of roofs, in the application of lining to roofs, and also in the lining of tubes in shaft lining or drainage work.

To improve the performance characteristics of these sealing products, which are generally based on bitumens with penetrabilities of between 80 and 220, compositions of bitumens modified by the addition of thermoplastic polymers have been used. U.S. Pat. No. 3,249,567 describes compositions comprising from 5 to 95 weight percent bitumen (in particular an aromatic asphalt of petroleum origin) and from 95 to 5 weight percent of an ethylene/alkyl acrylate copolymer having a melt index between 0.01 and 150 and containing from 2 to 50 weight percent of an acrylate.

French Pat. No. 2,004,317 describes compositions comprising from 0.1 to 75 weight percent of a coal-tar pitch and from 99.9 to 25 weight percent of an ethylene/carboxylic acid copolymer.

French Pat. No. 2,022,583 describes compositions comprising from 33 to 80 weight percent bitumen and from 20 to 67 weight percent of an ethylene or propylene homopolymer or of an ethylene/vinyl ester copolymer.

French Pat. No. 2,228,817 describes a composition comprising: (A) from 35 to 99 weight percent of bitumen having a penetration index of between 1 and 500, (B) from 1 to 15 weight percent of a granular mixture comprising from 50 to 99 weight percent of a random ethylene/propylene/diene terpolymer and from 1 to 50 weight percent of a polyolefin having an average molecular weight of between 2,000 and 5,000; and (C) from 0 to 50 weight percent of a mineral filler.

French Pat. No. 2,303,838 describes mixtures consisting of from 10 to 90 weight percent bitumen; from 90 to 10 weight percent of a copolymer of olefins and unsaturated carboxylic acid esters; and from 0.1 to 10 weight percent of long-chain aliphatic alcohols containing at least 14 carbon atoms.

The best results up to now, however, have apparently been obtained with compositions of bitumens comprising from 8 to 15 weight percent of styrene/butadiene/styrene (SBS) block copolymers.

SUMMARY OF THE INVENTION

An object of the present invention comprises improving certain properties of sealing products. These properties include the ball-ring softening point, the cold bending strength, the modulus of rigidity and the elastic recovery.

An additional object of the invention is to improve the same properties measured after aging. A considerable disadvantage of bitumens modified by SBS copolymers is that their properties deteriorate substantially after aging under the effect of atmospheric agents.

Additional objects and advantages of the invention will be set forth in part in the description that follows, and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention comprises a sealing product comprising: from 35 to 95 weight percent of at least one distillation product selected from the group consisting of bitumens and soft pitches; and from 5 to 65 weight percent of a terpolymer having a melt index between 1 and 10 dg/minute and comprising: (i) from 88 to 98.7 mole percent of units derived from ethylene, (ii) from 1 to 10 mole percent of units derived from an ester selected from the group consisting of alkyl acrylates and methacrylates, wherein the alkyl group has from 1 to 6 carbon atoms, and (iii) from 0.3 to 3 mole percent of units derived from maleic anhydride.

DESCRIPTION OF THE PREFERRED EMBODIMENTS

Reference will now be made to the presently preferred embodiments of the invention.

Certain terpolymers used within the scope of the present invention have been described in French Pat. No. 1,323,379. Particular terpolymers which can also be used, having a polydispersity index greater than 6, have been described in French Patent Application No. 81/01,430. If appropriate, the invention may comprise a fourth monomer copolymerizable with the first three monomers of the above terpolymers and selected from α-olefins having from 3 to 8 carbon atoms, monoalkyl maleates and dialkyl maleates in which the alkyl groups have from 1 to 6 carbon atoms, vinyl acetate and carbon monoxide (present in an amount of up to 5 mole percent). The proportion of ethylene in the tetrapolymer would then be correspondingly reduced relative to the range indicated above.

The process for the manufacture of these last terpolymers involves copolymerizing a mixture of 94 to 99 weight percent ethylene, 0.7 to 5 weight percent (meth)acrylic acid ester, and 0.2 to 0.9 weight percent maleic anhydride in the presence of at least one free radical initiator in a reactor kept under a pressure of 1,000 to 3,000 bars and at a temperature of 170° C. to 280° C. After polymerization, the pressure is released, and the mixture of monomer and terpolymer formed in the reactor is separated. The separated mixture of ethylene and monomers is recycled to the reactor. The recycled flow comprises from 99 to 99.8 percent ethylene and from 0.2 to 1 percent (meth)acrylic acid ester.

The distillation products used within the scope of the present invention preferably have a penetrability of between 40 and 100. Thus, it is noteworthy that the bitumens which are useful for the present invention can have a penetrability of less than 80 and even of less than 60, in contrast to those used in compositions with SBS copolymers. The bitumens and soft pitches used within the scope of the present invention are products resulting from the distillation of carbochemical or petroleum residues.

The compositions according to the invention are applicable to the manufacture of sealing products generally in sheet form. They may be converted to sealing sheets either by the so-called multilayer technique of impregnation or by the so-called monolayer technique of extrusion through a flat die. Before being converted to sealing products, the compositions of the invention may be treated with any commonly used additives such as plasticizers, antioxidants and fungicides, and fillers such as very fine mineral powders.

The sealing products of the invention possess improved performance characteristics compared with earlier products, in particular properties such as the ball-ring softening point, the cold bending strength, the modulus of rigidity, and the elastic recovery, both before and especially after aging.

The examples below are for purposes of illustration and in no way imply a limitation on the scope of the invention.

EXAMPLES 1 AND 2—MANUFACTURE OF THE TERPOLYMERS

A cylindrical autoclave reactor is used which comprises three zones, each with a volume of 1 liter, and which is equipped with a blade stirrer. The zones are separated by valve screens. Fresh ethylene, compressed by a first compressor, feeds the first zone. The second zone is fed with a homogeneous mixture of ethylene, maleic anhydride (MA) and ethyl acrylate (EA). A solution of tertbutyl 2-ethylperhexanoate in a hydrocarbon cut is injected into the third zone. The latter is therefore the only reaction zone because it brings the three comonomers and a free radical initiator into contact. Table I shows the proportions by weight of maleic anhydride and ethyl acrylate, relative to the ethylene in the reaction zone and the temperature in the zone. The reactor is kept under a pressure of 1,600 bars. Located at the bottom of the third zone of the reactor, there is a relief valve making it possible to lower the pressure to 300 bars. After it has passed through the relief valve, the mixture of molten polymer and gaseous monomers passes into a separating hopper. The polymer is collected at the bottom of the hopper, and the monomers are passed through a degreasing hopper and then led into a second compressor.

A solution of maleic anhydride in ethyl acrylate is pumped in under pressure and led into the inlet of a Venturi-type homogenizer, where it is mixed with the flow of recycled monomers coming from the second compressor. At the outlet of this Venturi device, the mixture of the three monomers is led into a spiral homogenizer and then transferred to the second zone of the reactor.

At the outlet of the separating hopper, the manufactured terpolymer is analyzed by infrared spectrophotometry and the proportions in moles of ethyl acrylate units and maleic anhydride units are determined. These values are indicated in Table I below. The melt index of the polymer is determined according to ASTM Standard Specification D 1238-73 and expressed in dg/minute.

The following characteristics of the polymer are also measured: density $\rho$, expressed in $g/cm^3$ and determined according to ASTM Standard Specification D 2839; number-average molecular weight, Mn, determined by gel permeation chromatography; polydispersity index, determined by the same method and equal to the ratio Mw/Mn, Mw being the weight-average molecular weight; and Vicat softening point, expressed in degrees centigrade and determined according to the French Standard Specification T 51-012(1).

The results of these measurements are shown in Table II below.

TABLE I

| Example | T °C. | Reactor % MA | Reactor % EA | Polymer % MA | Polymer % EA | MI |
|---|---|---|---|---|---|---|
| 1 | 170 | 0.3 | 4.0 | 0.9 | 6.1 | 7.1 |
| 2 | 180 | 0.3 | 3.5 | 1.0 | 4.7 | 8.2 |

TABLE II

| Example | Density | Mn | Mw/Mn | T Vicat |
|---|---|---|---|---|
| 1 | 0.942 | 19,000 | 6.1 | 48 |
| 2 | 0.942 | 15,500 | 9.0 | 51 |

EXAMPLES 3 (COMPARATIVE) 4, AND 5

A sealing sheet is prepared from a mixture comprising 10 parts by weight of a thermoplastic polymer, 60 parts by weight of a bitumen having an average penetrability at 25° C. of between 80 and 100, and 30 parts by weight of a powdered slate, for Examples 3 and 4.

In Example 3 (comparative), the thermoplastic polymer is a styrene/butadiene/styrene block copolymer, while in Example 4, the thermoplastic polymer is the terpolymer of Example 1 above.

The following properties are then measured on the products thus obtained, before and after aging: ball-ring softening point (BRT), expressed in °C. and determined according to French Standard Specification T 66008; the cold bending strength (CBS), determined by rolling the sheet around a mandrel of diameter 10 mm, and measured as the temperature (expressed in °C.), from which the sheet tears or cracks; the modulus of rigidity (MR) at 25° C., expressed in $newtons/cm^2$; and the elastic recovery (ER), expressed in percent.

The properties after aging are measured on the products after they have been in a ventilated oven at 70° C. for 1 month.

The results of these measurements are collated in Table III below.

For Example 5, the sealing sheet was prepared from a mixture comprising 5 parts by weight of the terpolymer of Example 1 above, 65 parts by weight of the bitumen of examples 3 and 4 and 30 parts by weight of the same powdered slate.

TABLE III

| Example | Before aging BRT | Before aging CBS | Before aging MR | Before aging ER | After aging BRT | After aging CBS | After aging MR | After aging ER |
|---|---|---|---|---|---|---|---|---|
| 3 | 118 | −30 | 55 | 180 | 111 | −25 | 55 | 115 |
| 4 | 125 | −18 | 60 | 230 | 124 | −18 | 60 | 230 |
| 5 | 108 | − 8 | 45 | 190 | 108 | −10 | 45 | 190 |

EXAMPLES 6 AND 7

Mixtures consisting of varying amounts of the terpolymer of Example 2 and a bitumen having an average penetrability at 25° C. of between 40 and 50 are extruded through a flat die in order to form a sealing sheet.

The elongation at break, expressed in percent and determined according to ASTM Standard Specification D 882-67 is then measured on the products thus obtained, before and after aging.

The properties after aging are measured on the products after they have been in a ventilated oven at 80° C. for 1 month. The results of these measurements are collated in Table IV below.

TABLE IV

| Example | Weight Percent Terpolymer | Elongation at break Before aging | Elongation at break After aging |
| --- | --- | --- | --- |
| 6 | 50 | 850 | 650 |
| 7 | 60 | 950 | 720 |

It will be apparent to those skilled in the art that various modifications could be made in the composition of the invention without departing from the scope or spirit of the invention.

What is claimed is:

1. A composition for sealing products comprising:
   (a) from 35 to 95 weight percent of at least one distillation product selected from the group consisting of bitumens and soft pitches; and
   (b) from 5 to 65 weight percent of a terpolymer having a melt index between 1 and 10 dg/min and comprising: (i) from 88 to 98.7 mole percent of units derived from ethylene, (ii) from 1 to 10 mole percent of units derived from an ester selected from the group consisting of alkyl acrylates and methacrylates, wherein said alkyl group contains from 1 to 6 carbon atoms, and (iii) from 0.3 to 3 mole percent of units derived from maleic anhydride.

2. The composition of claim 1, wherein said terpolymer has a polydispersity index greater than 6.

3. The composition of claim 1, wherein said terpolymer further comprises a fourth monomer copolymerizable with each element of said terpolymer and selected from the group consisting of α-olefins having from 3 to 8 carbon atoms, monoalkyl maleates, and dialkyl maleates wherein said monoalkyl and dialkyl groups have from 1 to 6 carbon atoms, vinyl acetate, and carbon monoxide, present in an amount of up to 5 mole percent.

4. The composition of claim 1, wherein said distillation product has a penetrability of between 40 and 100.

5. A sealing product obtained from the composition according to claim 1.

6. The sealing product of claim 5 in the form of sheets.

7. The sealing product of claim 6, wherein said product is obtained by extrusion of said composition through a flat die.

8. The sealing product of claim 6, wherein said product is obtained by impregnation of said composition.

* * * * *